United States Patent
Kuboyama et al.

(10) Patent No.: US 7,505,904 B2
(45) Date of Patent: Mar. 17, 2009

(54) DATABASE CONSTRUCTION APPARATUS AND METHOD

(75) Inventors: Hideo Kuboyama, Yokohama (JP); Masayuki Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 532 days.

(21) Appl. No.: 11/313,027

(22) Filed: Dec. 19, 2005

(65) Prior Publication Data

US 2006/0136204 A1      Jun. 22, 2006

(30) Foreign Application Priority Data

Dec. 20, 2004   (JP)   .............................. 2004-368524

(51) Int. Cl.
*G06F 17/00* (2006.01)
(52) U.S. Cl. ...................... 704/242; 707/102
(58) Field of Classification Search ................ None
See application file for complete search history.

(56) References Cited

U.S. PATENT DOCUMENTS

| | | | |
|---|---|---|---|
| 6,507,815 B1 | 1/2003 | Yamamoto | |
| 6,741,191 B2 | 5/2004 | Jang et al. | |
| 6,889,226 B2 * | 5/2005 | O'Neil et al. | 707/100 |
| 7,222,129 B2 * | 5/2007 | Kuboyama et al. | 707/103 Y |
| 2005/0288928 A1 * | 12/2005 | Bergl et al. | 704/242 |
| 2006/0173927 A1 * | 8/2006 | Beyer et al. | 707/201 |

FOREIGN PATENT DOCUMENTS

| | | |
|---|---|---|
| JP | 01-145722 | 6/1989 |
| JP | 10-063522 | 3/1998 |
| JP | 2003-256432 | 9/2003 |
| JP | 2003-273748 | 9/2003 |

OTHER PUBLICATIONS

Khal, D. Yoshikawa, M. Uemura, Shunsuke. "A Structural Numbering Scheme for XML Data", XML Based Data Management and Multimedia Engineering Workshops 2002.*
Japanese Office Action dated Dec. 4, 2006 for the Japanese counterpart patent application No. 2004-368524 with English translation.

* cited by examiner

*Primary Examiner*—David R Hudspeth
*Assistant Examiner*—Matthew J Sked

(57) ABSTRACT

A database construction apparatus and method which construct a tree structure database are provided. First of all, consecutive node numbers are assigned to nodes for each layer, from an upper layer to a lower layer in a tree structure, in the order of the node numbers of parent nodes. Thereafter, the respective nodes are assigned child node relative numbers representing relative values between the node numbers and the node numbers of corresponding child nodes.

7 Claims, 11 Drawing Sheets

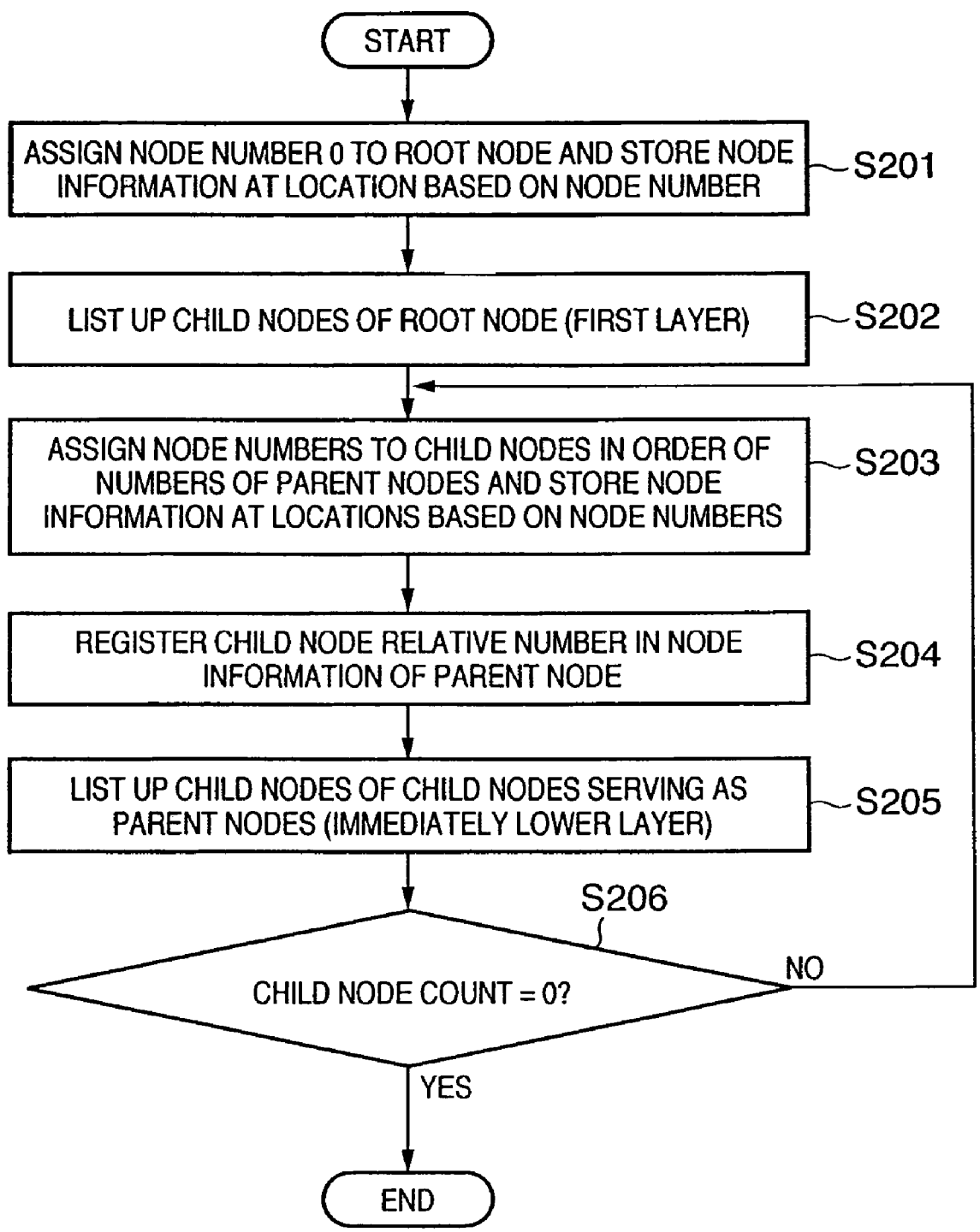

[NODE INFORMATION OF NODE 8]

PHONEME COUNT : 3
PHONEME : "a" , "m" , "a"
CHILD NODE COUNT : 2
CHILD NODE RELATIVE NUMBER : 8,9 
DATA COUNT : 0
DATA NUMBER : -

CHILD NODE NUMBER 16, 17 - SELF NODE NUMBER 8 = 8,9

[NODE INFORMATION OF NODE 8]

PHONEME COUNT : 3
PHONEME : "a" , "m" , "a"
CHILD NODE COUNT : 2
START CHILD NODE RELATIVE NUMBER : 8
DATA COUNT : 0
DATA NUMBER :

CHILD NODE NUMBER 16, 17 - SELF NODE NUMBER 8 = 8,9

FIG. 7

```
typedef struct{
        ... (OTHER MEMBERS)              CHILD NODE
        unsigned char      childNum;    COUNT
        unsigned char      childStart;   START CHILD NODE
}NodeInfo1;                              RELATIVE NUMBER typedef struct{
        ... (OTHER MEMBERS)
        unsigned short     childNum;
        unsigned short     childStart;
}NodeInfo2;

typedef struct{
        ... (OTHER MEMBERS)
        unsigned int       childNum;
        unsigned int       childStart;
}NodeInfo3;
```

FIG. 10

[NODE INFORMATION OF NODE 14]

PHONEME COUNT : 3
    PHONEME : "a" , "m" , "a"
    CHILD NODE COUNT : 2
    CHILD NODE NUMBER :16,17
    DATA COUNT : 0
    DATA NUMBER :

[NODE INFORMATION OF NODE 17]

PHONEME COUNT : 2
    PHONEME : "d" , "a"
    CHILD NODE COUNT : 0
    CHILD NODE NUMBER : -
    DATA COUNT : 1
    DATA NUMBER : 8

DATABASE CONSTRUCTION APPARATUS AND METHOD

FIELD OF THE INVENTION

The present invention relates to an apparatus and method which constructe a tree structure database.

BACKGROUND OF THE INVENTION

In speech recognition or language analysis, a tree structure dictionary containing phonemes or phoneme sequences as nodes is used to quickly search for the information of a word. For example, in speech recognition, features are extracted from input speech, and the output probability of an acoustic model forming each word is obtained in accordance with the words and acoustic models written in a recognition dictionary. A search method such as Viterbi search is then used to search for the likelihood of each state of a word or each of phonemes constituting the word, thereby performing speech recognition. U.S. Pat. No. 6,507,815 discloses a technique of decreasing the likelihood calculation count for a portion which can be shared by words by using a tree structure dictionary in order to decrease the computation amount of likelihood calculation for each phoneme of a word in each time interval of input speech.

FIG. 9 shows an example of a conventional tree structure dictionary used for speech recognition. Referring to FIG. 9, reference numeral 901 denotes a node formed by a phoneme or phoneme sequence of a word. Such nodes are shared by a plurality of words to form a tree structure. Reference numeral 902 denotes a link for establishing a parent-child relationship between nodes; 903, a node number serving as the identifier of the node; and 904, data stored in a tree structure dictionary. When the tree structure is traced from the node at the top (root node) to a node at the bottom (leaf node), the phoneme sequence contained in the traced nodes represents a word, and the data 904 of the word can be acquired from the leaf node.

Likelihood calculation in speech recognition basically needs to be performed for each phoneme in each node. In the case of a tree structure dictionary, however, as described above, since a node is shared by a plurality of words, likelihood calculation for a phoneme in the shared node can also be shared. For example, referring to FIG. 9, likelihood calculation for "k" with node number 2 can be shared by four words "kawano", "kimura", "kimoto", and "kijima". For this reason, likelihood calculation needs to be performed only once, and hence high-speed operation can be realized unlike the case without any tree structure dictionary, in which likelihood calculation must be performed four times when the likelihood of each word is to be calculated.

In order to form a tree structure dictionary, each node 901 needs to have the information of each child node to which a transition is made from the node. FIG. 10 is a view showing the node information which each node of the tree structure dictionary has, and more specifically, showing the node information of a node 14 and that of a node 17 in FIG. 9 as typical examples. As shown in FIG. 10, node information includes the information of "phoneme count", "phoneme", "child node count", "child node number", "data count", and "data number". In this case, "phoneme count" and "phoneme" are pieces of information necessary to perform likelihood calculation for each node. The pieces of information of "child node count" and "child node number" are pieces of information necessary for node transition. "Data count" indicates the number of data linked to the corresponding node, i.e., the number of words with identical phoneme sequences. Note that a data count of 0 indicates that the corresponding node is not a leaf node. In addition, "data number" is information necessary to acquire the information of the corresponding word from the leaf node representing the word end.

When a tree structure dictionary is to be implemented in hardware, a problem arises in terms of the storage capacity required for node information. That is, as the number of words registered in a tree structure dictionary increases, the number of nodes increases, resulting in an increase in data amount necessary for the storage of node information. There is a requirement for a reduction in storage capacity necessary for node information.

SUMMARY OF THE INVENTION

In view of the above problems in the conventional art, the present invention has an object to provide an apparatus and method which construct a tree structure database with a reduced storage capacity for node information.

According to one aspect of the present invention, a database construction apparatus and method which construct a tree structure database are provided. First of all, consecutive node numbers are assigned to nodes for each layer, from an upper layer to a lower layer in a tree structure, in the order of the node numbers of parent nodes. Thereafter, the respective nodes are assigned child node relative numbers representing relative values between the node numbers and the node numbers of corresponding child nodes.

The above and other objects and features of the present invention will appear more fully hereinafter from a consideration of the following description taken in conjunction with the accompanying drawing wherein one example is illustrated by way of example.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a flowchart showing database construction processing in the embodiment of the present invention;

FIG. 7 is a view showing description examples of structures for the storage of node information in another embodiment of the present invention;

FIG. 10 is a view showing an example of node information according to the prior art.

DETAILED DESCRIPTION OF THE PREFERRED EMBODIMENTS

Preferred embodiments of the present invention will be described in detail in accordance with the accompanying drawings. The present invention is not limited by the disclosure of the embodiments and all combinations of the features described in the embodiments are not always indispensable to solving means of the present invention.

As described above, when a tree structure dictionary is to be implemented in hardware, there is a requirement for a reduction in storage capacity for node information.

The data size of each piece of node information shown in FIG. 10 will be examined.

First of all, the data size required for the storage of "data number" can be easily predicted from the number of words registered. For example, for a task of 100-word speech recognition, one byte is sufficient for a data type necessary to store "data number". As described above, "data count" indicates the number of words with identical phoneme sequences, and a data size necessary for storage can be determined by imposing a limitation on the number of words. A data size necessary to store "phoneme count" as well can be determined by imposing a limitation on the phoneme length of a word. In addition, since the size of a tree structure does not expand beyond the number of leafs regardless of how much a transition extends from a given node, a data size necessary to store "child node count" can be determined in the same manner as "data number". Conversely, the data sizes of these pieces of information are almost determined depending on the performance required for an application using the tree structure dictionary.

On the other hand, since "child node number" is large in number and can vary depending on the degree of partial sharing of words or the word length as well as identical word counts or identical phoneme sets, it is difficult to simply predict a data size necessary to hold node numbers from the number of words registered or the number of phonemes. Conventionally, therefore, a relatively large data size is set to store "child node number" in consideration of redundancy.

The present invention takes into account the redundancy of the data size of such "child node number" and is directed to reduce the data size of node information by introducing the process of reducing the redundancy.

A preferred embodiment of the present invention will be described in detail below with reference to the accompanying drawings.

Figure 1A:
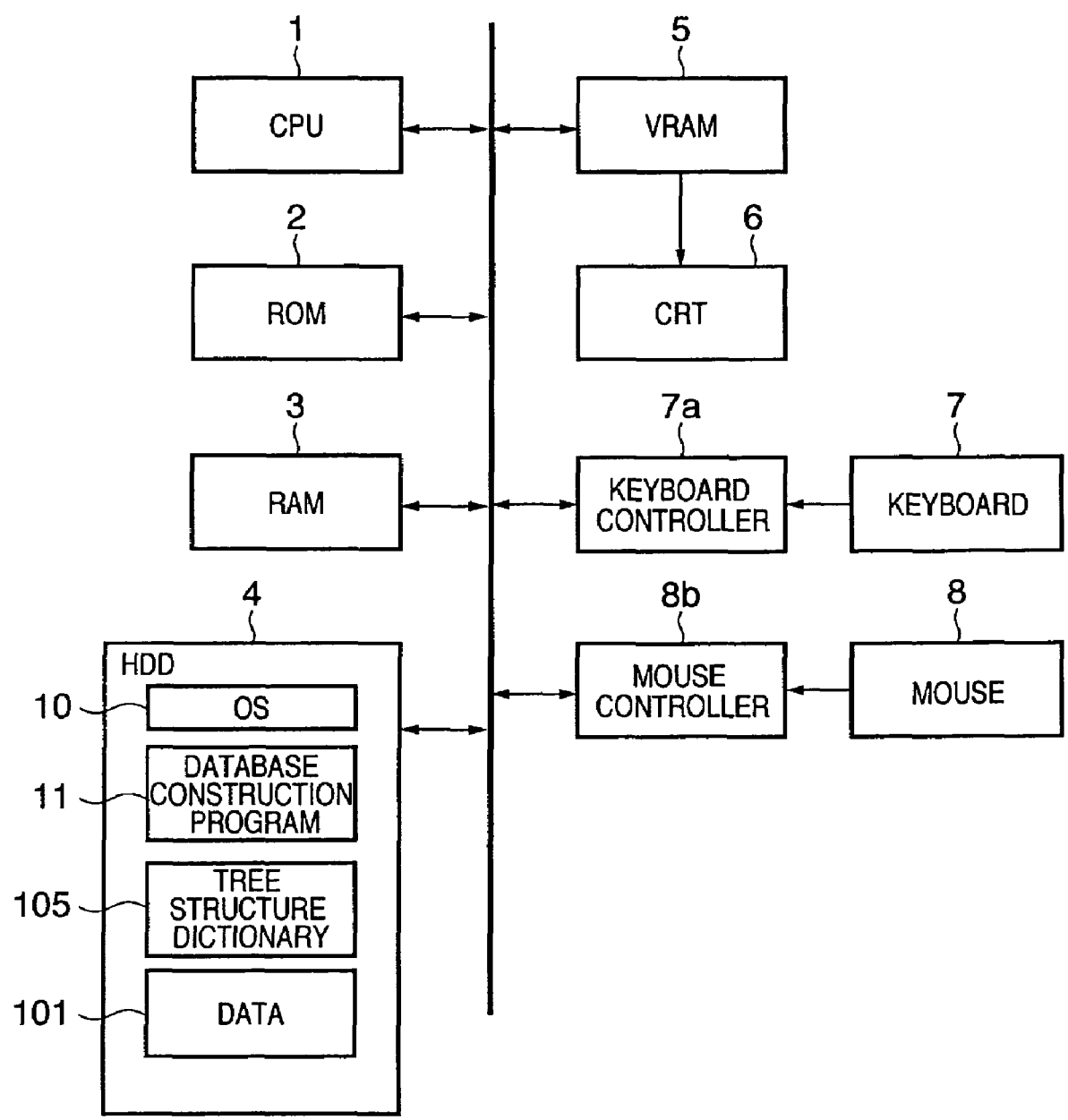
FIG. 1A is a block diagram showing an example of the arrangement of a computer system which implements a database construction apparatus according to the present invention.

FIG. 1A is a view showing an example of the arrangement of a computer system which implements the function of the database construction apparatus of the present invention.

The computer system shown in FIG. 1A includes a CPU 1 which controls the overall apparatus, a ROM 2 which stores permanent data such as a boot program, and a RAM 3 functioning as a main memory. In addition, the computer system has the following arrangement.

An HDD 4 is a hard disk drive, which stores, in addition to an OS 10, a database construction program 11, a tree structure dictionary 105 serving as a database constructed by executing the database construction program 11, and data 101 containing a list of words linked to the leaf nodes of the tree structure dictionary 105, and the like.

In addition, a VRAM 5 is a memory in which image data to be displayed is bitmapped. Bitmapping image data or the like in this memory makes it possible to display the resultant data on a CRT 6 as an example of a display device. Reference numerals 7 and 8 denote a keyboard and mouse, respectively, which perform various kinds of input operations. The keyboard and the mouse respectively connected to a keyboard controller 7a and mouse controller 8b which transfer interrupt signals to the CPU 1.

The database construction program 11 is loaded into the RAM 3 in accordance with a specific instruction event from the keyboard 7 or the mouse 8, and is executed by the CPU 1. As a consequence, this computer system functions as a database construction apparatus.

Figure 1B:
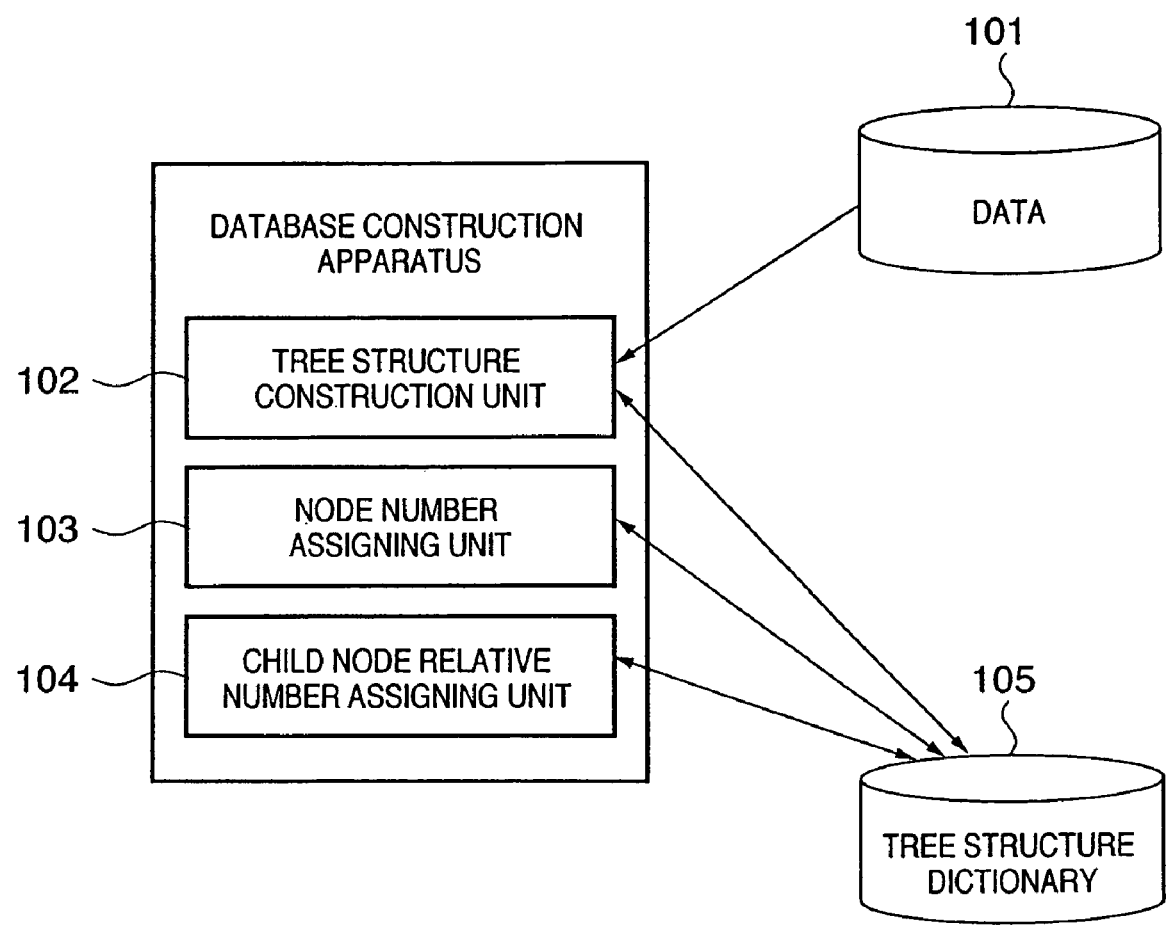
FIG. 1B is a block diagram showing the functional arrangement of a database construction apparatus according to an embodiment of the present invention.

FIG. 1B is a block diagram showing the functional arrangement of the database construction apparatus according to this embodiment. As described above, the database construction apparatus according to this embodiment is realized by executing the database construction program 11. The database construction program 11 has the following module arrangement.

Reference numeral 102 denotes a tree structure construction unit which constructs a tree structure by forming nodes at common portions such as phonemes between data; 103, a node number assigning unit which assigns numbers to the respective nodes of the tree structure; and 104, a child node relative number assigning unit which assigns a given node the information of a child node to which a transition can be made from the node as the relative value of a node number. As a result of these processes, the tree structure dictionary 105 is constructed and stored in the HDD 4.

Figure 3:
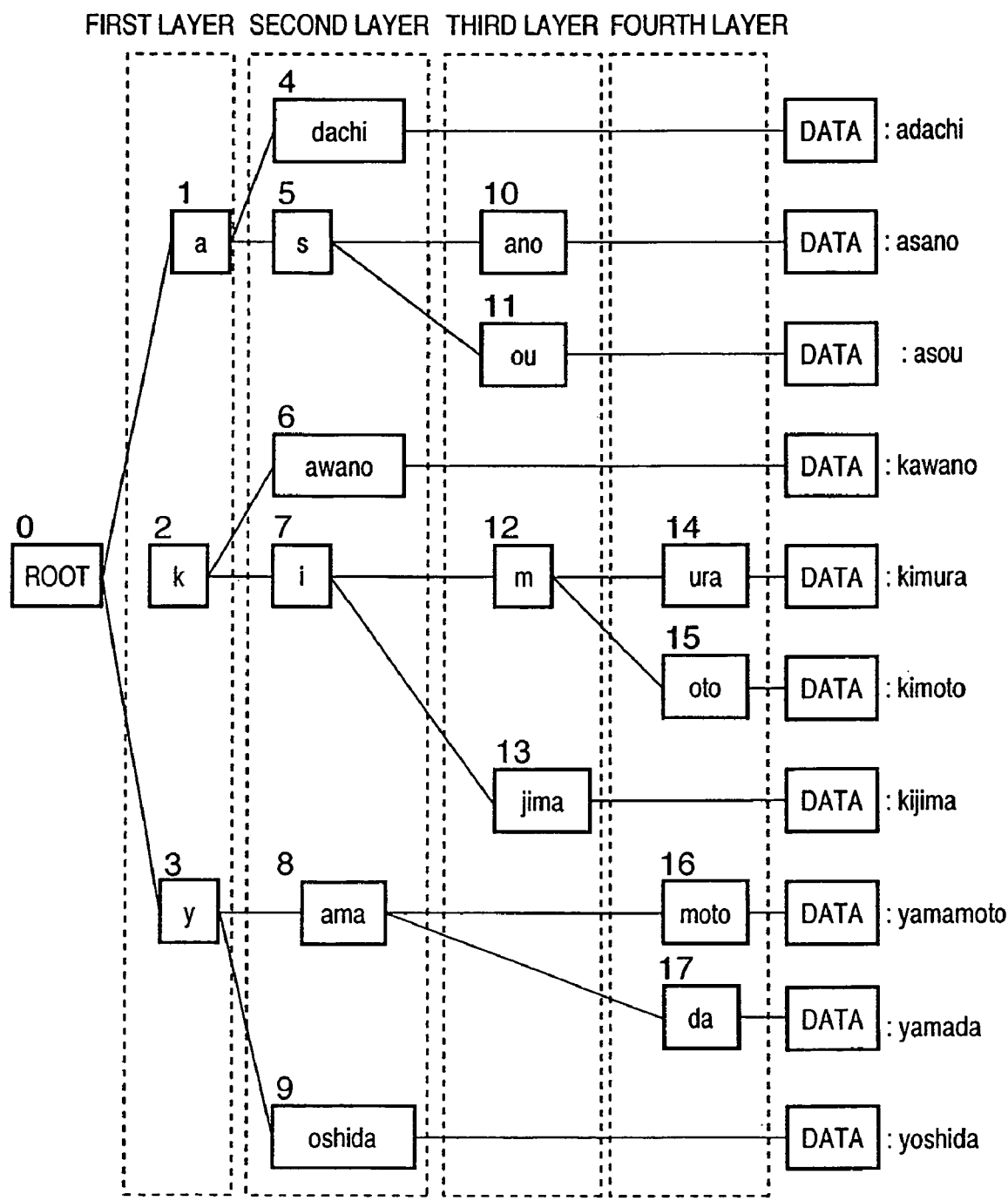
FIG. 3 is a view showing an example of a tree structure dictionary constructed with node numbers being assigned thereto according to the present invention.

FIG. 2 is a flowchart showing database construction processing by the database construction apparatus according to this embodiment. FIG. 3 is a view showing an example of a tree structure dictionary constructed by the assignment of node numbers by this database construction processing. Database construction processing in this embodiment will be described in detail below with reference to FIGS. 2 and 3.

First of all, in step S201, the node number assigning unit 103 assigns number 0 to the root node, and stores the node information of the root node at a location based on number 0 (e.g., the 0th position in an array).

In step S202, child nodes of the root node are listed up as nodes on the first layer. In the case shown in FIG. 3, they are nodes "a", "k", and "y" to which transitions can be made from the root.

In step S203, the node number assigning unit 103 assigns them node numbers in the order of the numbers of parent nodes, and stores the respective pieces of node information at locations based on the node numbers. On the first layer, all the nodes have node 0 as a parent node, and hence the order of assignment is arbitrary.

In step S204, the child node relative number assigning unit 104 registers the relative numbers between the respective child nodes and their parent node in the node information of the parent node.

With this processing, node registration on the first layer is complete. In step S205, child nodes of the respective nodes are listed up as nodes on the second layer.

If it is determined in step S206 that there is no child node, the processing is terminated. If there is any child node, the flow returns to step S203. Referring to FIG. 3, "a", "k", and "y" have two child nodes, respectively, three child nodes, and two child nodes, and hence the flow returns to step S203 to assign numbers to the child nodes of "a", "k", and "y" in the order of the numbers of the parent nodes. When these operations are continued up to a layer on which no child node exists, as shown in FIG. 3, node numbers are assigned to the respective nodes, and the relative numbers of the child nodes are added to the respective pieces of node information.

Figure 4:
FIG. 4 is a view showing an example of node information in the embodiment of the present invention.

FIG. 4 shows the node information of node 8 as an example of node information held by each node. As shown in FIG. 4, node information includes "phoneme count" contained in a node, "phoneme" contained in the node, "child node count", "child node relative number", "data count", and "data number". The node "ama" with node number 8 in FIG. 3 has nodes 16 and 17 as child nodes, and hence "child node relative number" is 8,9 which is obtained by subtracting its own number 8 from the respective child node numbers. Since the tree structure does not expand beyond the number of leafs regardless how much the tree structure expands on each level, "child node relative number" is limited by the number of leaf nodes of the tree structure, i.e., the number of data with different phoneme sequences, regardless of the size of the tree structure. This makes it possible to reduce the data amount necessary to store node information.

Alternatively, with regard to "child node relative number", data may be held in the following manner.

Figure 5:
FIG. 5 is a view showing node information in another embodiment of the present invention.

The node number assigning unit 103 assigns consecutive numbers to child nodes in the order of the numbers of parent nodes. Therefore, child nodes having the same parent node are assigned consecutive numbers. For example, the numbers of the child nodes of "ama" with node number 8 in FIG. 3 are the consecutive numbers 16 and 17. That is, if only the number of child nodes is known, only holding only the number of one child node at a specific position as "start child node relative number" makes it possible to reconstruct the numbers of the remaining child nodes. FIG. 5 shows an example of storing "start child node relative number", instead of storing the numbers of all the child nodes, on the basis of this idea. More specifically, this node information is written such that "child node count" is 2 and "start child node relative number" is 8. Based on this information, not only child node 16 is reconstructed, but also child node 17 having a consecutive number is reconstructed. This makes it possible to further reduce the data amount necessary for the storage of node information.

A characteristic feature of the database construction processing described above is that the maximum size of child node number information is limited to the number of leaf nodes by holding information specifying child nodes in the form of relative values from parent nodes. This makes it possible to reduce the data amount necessary to store node information. More specifically, this allows "child node relative number" in this embodiment to be expressed by a variable of a 1-byte data type, unlike in the prior art in which "child node number" (see FIG. 10) needs to be expressed by a variable of a 2-byte data type.

However, the data amount necessary to store child node relative numbers cannot be uniformly determined because the size of a tree structure dictionary varies depending on applications. Another embodiment to be described below, therefore, additionally adopts the process of dynamically determining one of a plurality of data types of child node relative numbers prepared in advance in accordance with the number of words read in constructing a tree structure dictionary.

Figure 6:
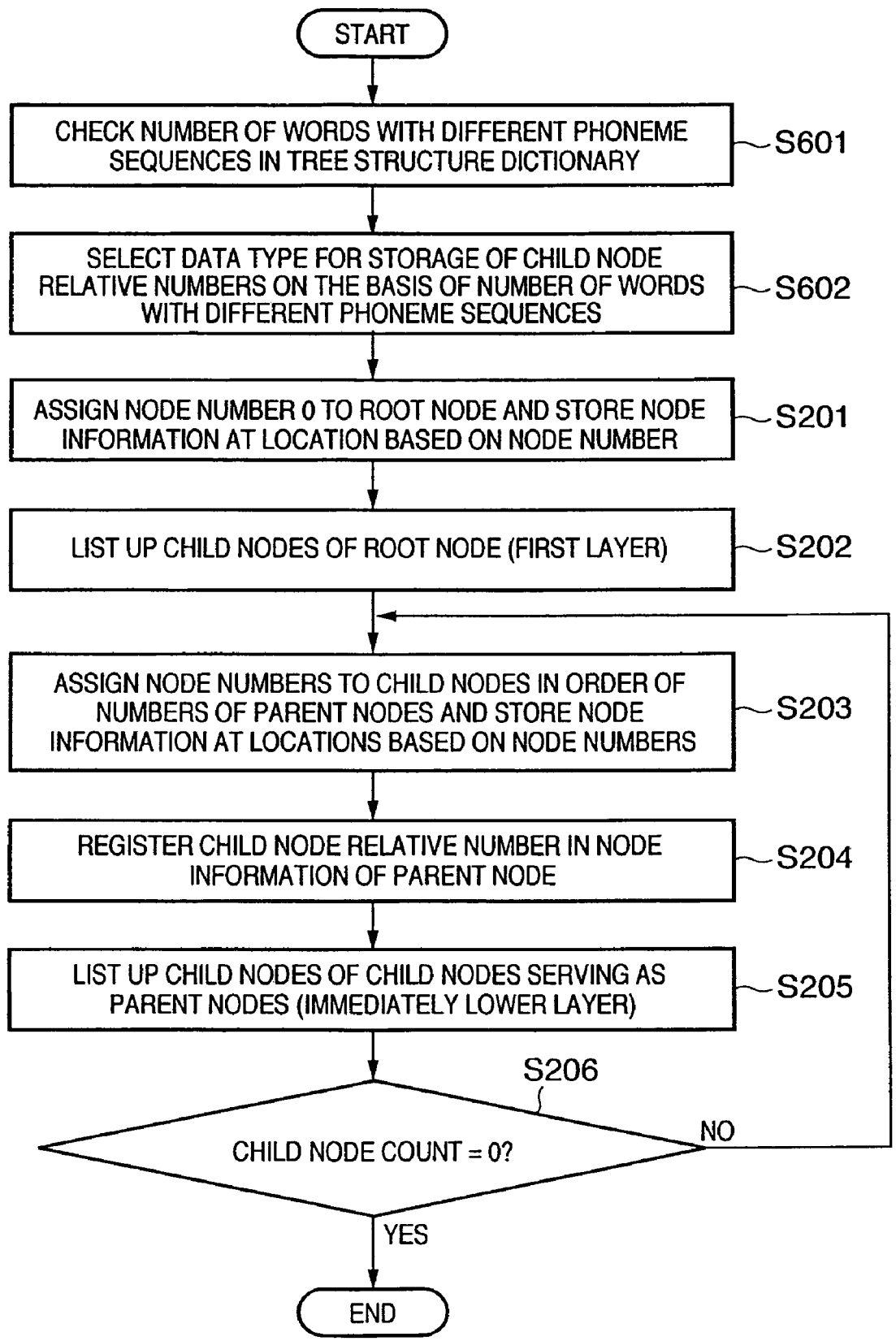
FIG. 6 is a flowchart showing database construction processing in another embodiment of the present invention.

FIG. 6 is a flowchart showing a modification of the database construction processing in this embodiment. Although this flowchart is basically the same as that shown in FIG. 2, steps S601 and S602 are added as pre-processing before step S201.

First of all, in step S601, the number of words with different phoneme sequences (i.e., the number of leaves) to be registered in the tree structure dictionary 105 is checked. In step S602, a data type with the minimum data size that allows the storage of a value representing the number of words with different phoneme sequences checked in step S601 is selected from a plurality of data types with different data sizes.

Subsequently, the processing in step S201 and subsequent steps described above is performed. A child node relative number in node information is defined by the variable of the data type selected in step S602. In this manner, an optimal data type representing a child node relative number is set in accordance with the number of words registered.

FIG. 7 shows an example of a plurality of structures prepared as node information, which are written in the C language. As shown in FIG. 7, a structure associated with node information includes a child node count and a start child node relative number (see FIG. 5) as members. In three kinds of structures, different data types are declared. More specifically, in NodeInfo1 structure, unsigned char (i.e., 1 byte) is declared as a data type for variable childNum representing a child node count and variable childStart representing a start child node relative number. In NodeInfo2 structure, unsigned short (i.e., 2 bytes) is declared as a data type for variable childNum representing a child node count and variable childStart representing a start child node relative number. In NodeInfo3, unsigned int (4 bytes in this case although it depends on the computer used for implementation) is declared as a data type for variable childNum representing a child node count and variable childStart representing a start child node relative number.

Assume that a typedef declaration like that described above has been made. In this case, if the number of words with different phoneme sequences checked in step S601 falls within one byte, NodeInfo1 structure is selected in step S602. If the number of words does not fall within one byte but falls within two bytes, NodeInfo2 structure is selected. If the number of words does not fall within two bytes and requires four bytes, NodeInfo3 is selected.

According to the above processing, a data type for "child node relative number" or "start child node relative number" is dynamically determined in accordance with an application using a tree structure dictionary. As a consequence, the data amount of node information can be optimized.

Although the embodiment of the present invention has been described above, the tree structure to be used is not limited to that described in the above embodiment. For example, a tree structure may be held for each leading phoneme. Alternatively, a tree structure may be constructed by triphones each comprising three phonemes, which are widely used for speech recognition.

Figure 8:
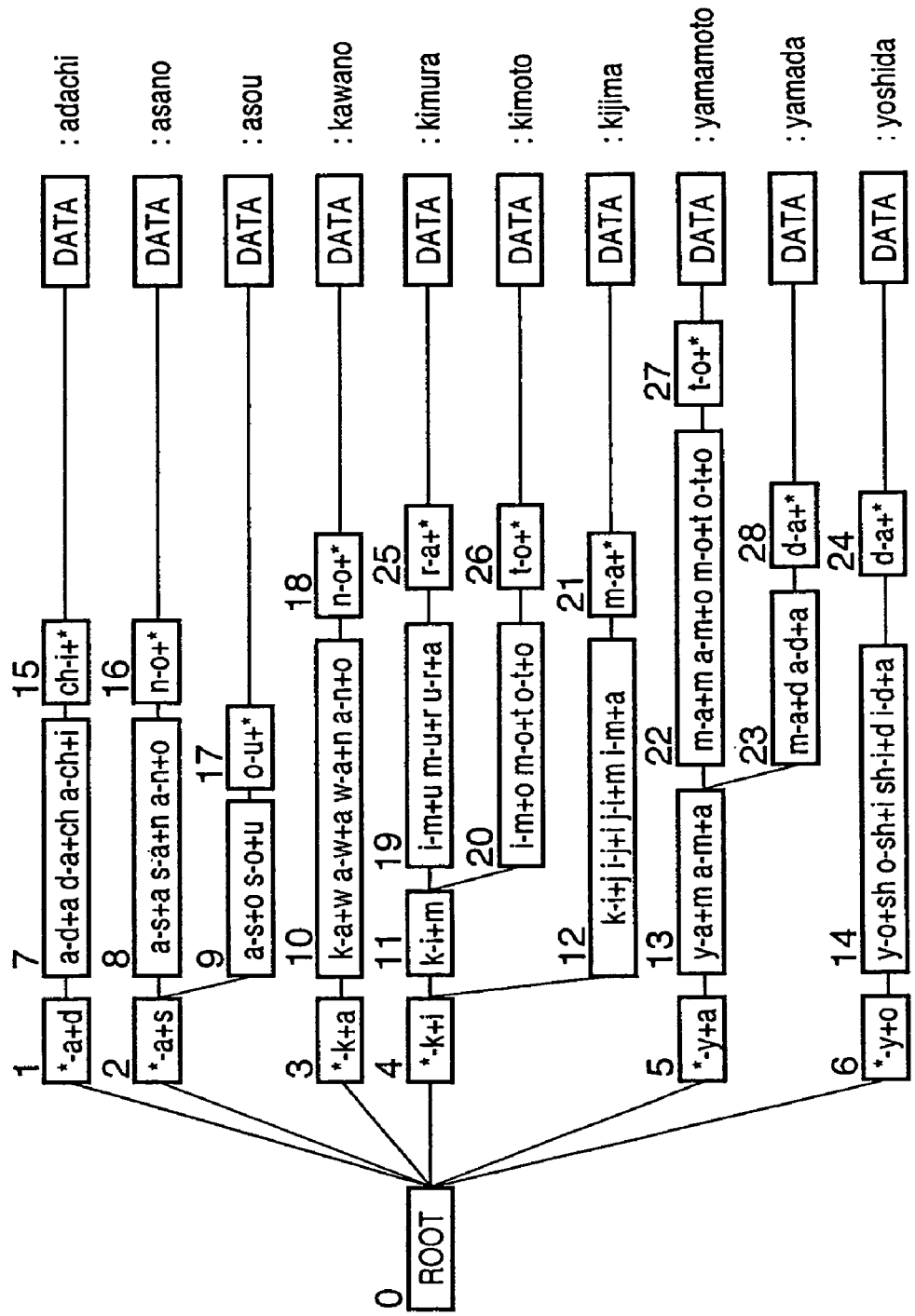
FIG. 8 is a view showing an example of a tree structure dictionary in another embodiment of the present invention.
Figure 9:
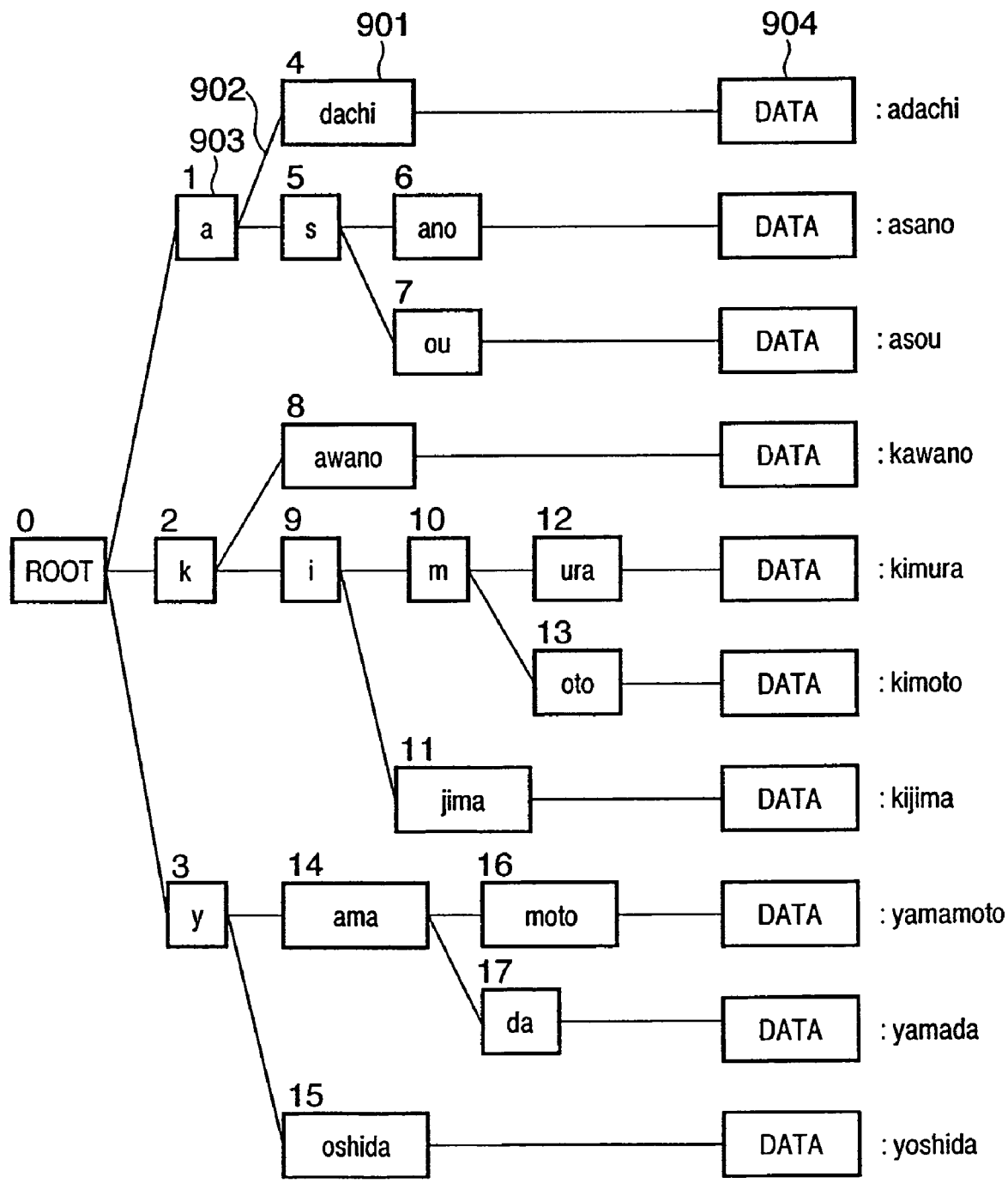
FIG. 9 is a view showing an example of a tree structure database according to the prior art.

FIG. 8 shows an example of a tree structure dictionary using triphones, which represents the same data as that shown in FIG. 3. The shape of a tree structure using triphones differs from that using phonemes because different portions are shared in these structures. Nodes on the first layer linked from the root, in particular, need to be parsed in a number equal to the number of last phonemes of words which can be connected forward to the nodes. Likewise, leaf nodes need to be developed in a number equal to the number of first phonemes of words which can be connected backward to the nodes. Referring to FIG. 8, these phonemes are expressed by "*", and hence each node is formed by using one triphone.

In the above embodiment, in constructing a tree structure dictionary, the tree structure construction unit 102 constructs a tree structure from data 101 such as a word list. In this case, the node number assigning unit 103 assigns node numbers, and the child node relative number assigning unit 104 assigns child node relative numbers in node information. However, the present invention is not limited to this, and a tree structure dictionary in which a tree structure has already been constructed may be used as an input. The number of words with different phonemes in a database is grasped and a data type is determined by inputting a conventional three structure dictionary, causing the node number assigning unit 103 to assign node numbers in the order of the numbers of parent nodes on each level, and causing the child node relative number assigning unit 104 to assign child node relative numbers to node information. This can reduce the data size of a tree structure dictionary. Note that in this case, the data 101 and the tree structure construction unit 102 are not required.

It is obvious that data search processing is realized by using the tree structure dictionary constructed by the database construction apparatus according to the embodiment described above. In this data search processing, the data type of the tree structure dictionary in which child node relative numbers are stored is discriminated from the number of words with different phoneme sequences, and the numbers of child nodes are reconstructed from child node relative numbers to make transitions to the child nodes, thereby making a search.

As will be understood by those who are skilled in speech processing, it is obvious that speech recognition processing can be realized by using the tree structure dictionary having common phoneme sequences as nodes described above as a recognition dictionary.

In addition, the present invention is not limited to a tree structure dictionary having common phoneme sequences as nodes, and can be applied to all databases having tree structures.

According to the above embodiments of the present invention, child nodes to which transitions are made from the respective nodes are managed with relative numbers. Since it is guaranteed that these relative numbers are limited to the number of leafs in a tree structure dictionary, a data type necessary for the relative numbers can be discriminated from the number of leafs. This makes it possible to achieve a reduction in storage capacity by scalably changing data types in accordance with the number of leafs.

OTHER EMBODIMENTS

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-368524 filed on Dec. 20, 2004, the entire contents of which are hereby incorporated by reference herein.

What is claimed is:

1. A database construction apparatus which constructs a tree structure database, comprising:
 node number assigning means for assigning consecutive node numbers to nodes for each layer, from an upper layer to a lower layer in a tree structure, in the order of node numbers of parent nodes;
 child node relative number assigning means for assigning the respective nodes child node relative numbers representing relative values between the node numbers and the node numbers of corresponding child nodes; and
 data type determination means for determining a data type for the child node relative number on the basis of the number of leafs of a tree structure of a database to be constructed.

2. The apparatus according to claim 1, wherein said child node relative number assigning means assigns each of the nodes only one child node relative number representing a relative value between the corresponding node number and a node number of a specific one of corresponding child nodes.

3. The apparatus according to claim 1, wherein said data type determination means selects a data type of a minimum data size that allows storage of the number of leafs of a tree structure of a database to be constructed from a plurality of data types with different data sizes.

4. A data search apparatus which performs a data search by using a tree structure database constructed by a database construction apparatus defined in claim 1.

5. A speech recognition apparatus which performs speech recognition by using a tree structure database constructed by a database construction apparatus defined in claim 1 as a recognition dictionary.

6. A database construction method for construction of a tree structure database, comprising the steps of:

assigning consecutive node numbers to nodes for each layer by a computer processor, from an upper layer to a lower layer in a tree structure, in the order of node numbers of parent nodes;

assigning the respective nodes child node relative numbers representing relative values between the node numbers and the node numbers of corresponding child nodes; and determining a data type for the child node relative number on the basis of the number of leafs of a tree structure of a database to be constructed.

7. A computer-readable storage medium having a computer-executable program for constructing a tree structure database, comprising the code for the steps of:

generating consecutive node numbers for nodes for each layer, from an upper layer to a lower layer in a tree structure, in the order of node numbers of parent nodes, and storing the node numbers in a memory;

generating, for the respective nodes, child node relative numbers representing relative values between the node numbers and the node numbers of corresponding child nodes, and storing the child node relative numbers in the memory; and determining a data type for the child node relative number on the basis of the number of leafs of a tree structure of a database to be constructed.

* * * * *